US012091305B2

(12) United States Patent
Comin et al.

(10) Patent No.: US 12,091,305 B2
(45) Date of Patent: Sep. 17, 2024

(54) DEVICE FOR DISPENSING A SMALL QUANTITY OF A LIQUID PRODUCT

(71) Applicant: SOCIETE DES PRODUITS NESTLE S.A., Vevey (CH)

(72) Inventors: Andrea Comin, Nancy (FR); Rony Abou-Naoum, Vittel (FR)

(73) Assignee: Societe des Produits Nestle S.A., Vevey (CH)

( * ) Notice: Subject to any disclaimer, the term of this patent is extended or adjusted under 35 U.S.C. 154(b) by 114 days.

(21) Appl. No.: 18/000,692

(22) PCT Filed: Jun. 8, 2021

(86) PCT No.: PCT/EP2021/065198
§ 371 (c)(1),
(2) Date: Dec. 5, 2022

(87) PCT Pub. No.: WO2021/249959
PCT Pub. Date: Dec. 16, 2021

(65) Prior Publication Data

US 2023/0211993 A1 Jul. 6, 2023

(30) Foreign Application Priority Data

Jun. 9, 2020 (EP) .................................... 20178950

(51) Int. Cl.
*B67C 3/20* (2006.01)
*B67C 3/26* (2006.01)
*B67C 3/28* (2006.01)

(52) U.S. Cl.
CPC ............ *B67C 3/208* (2013.01); *B67C 3/2608* (2013.01); *B67C 3/287* (2013.01)

(58) Field of Classification Search
CPC .. B67C 3/20; B67C 3/208; B67C 3/26; B67C 3/2608; B67C 3/28; B67C 3/287
See application file for complete search history.

(56) References Cited

U.S. PATENT DOCUMENTS 4,333,504 A * 6/1982 Golding .................. B67C 3/001 141/90
4,946,100 A * 8/1990 Flemming ......... B01F 35/71805 239/106

(Continued)

FOREIGN PATENT DOCUMENTS

| | | |
|---|---|---|
| FR | 2753190 | 3/1998 |
| WO | 03097516 | 11/2003 |
| WO | 2008112414 | 9/2008 |

*Primary Examiner* — Nicolas A Arnett
(74) *Attorney, Agent, or Firm* — K&L Gates LLP

(57) ABSTRACT

The invention relates to a device for dispensing a small quantity of a liquid product, comprising a dispensing head (9) comprising an injection nozzle (7) to dispense a desired quantity of liquid product. The dispensing head (9) comprises an inlet (2) connected to a source of the liquid product (12) and an outlet (3) provided with the injection nozzle (7). It comprises a first valve (10) and a second valve (11) installed in series. The device comprises a control system (17) to command an opening sequence of the first valve (10) and of the second valve (11), resulting in a time of concomitant opening of the valves. The invention also relates to a method for introducing a liquid product into a container using this device. The invention makes it possible to obtain a dispensing head, which allows the dispensing of a liquid product for a period less than the minimum opening period of the valves that it comprises.

13 Claims, 10 Drawing Sheets

(56) References Cited

U.S. PATENT DOCUMENTS

| | | | | |
|---|---|---|---|---|
| 6,527,009 | B2 * | 3/2003 | Zheng | F17C 5/02 137/15.04 |
| 8,726,946 | B2 * | 5/2014 | Clusserath | B67C 3/10 141/59 |
| 9,386,878 | B2 * | 7/2016 | Midden | A47J 31/4485 |
| 10,582,798 | B2 * | 3/2020 | Midden | A47J 31/4485 |
| 2016/0229677 | A1 * | 8/2016 | Girault | B67D 1/0085 |

* cited by examiner

DEVICE FOR DISPENSING A SMALL QUANTITY OF A LIQUID PRODUCT

CROSS REFERENCE TO RELATED APPLICATIONS

The present application is a National Stage of International Application No. PCT/EP2021/065198, filed on Jun. 8, 2021, which claims priority to European Patent Application No. 20178950.0, filed on Jun. 9, 2020, the entire contents of which are being incorporated herein by reference.

FIELD OF THE INVENTION

The present invention relates to dispensing small quantities of a fluid, such as a liquid product, in particular in industrial facilities for filling containers such as bottles, such as bottling machines and bottling lines.

In the present document, the invention is described in relation with bottle filling. The term bottle designates any type of bottle of any size, from flacons to large bottles. Although the invention is more particularly described in the present document in relation to bottle filling, and is particularly suited for such application, it encompasses filling of other similar containers such as for example cans or cardboard containers.

The invention relates more particularly to the addition of a liquid product designated by the term "additive" into a bottle (or another container) filled or not filled with another liquid material hereafter called "main liquid material". In the food industry, the additive may typically be an edible flavoring concentrate, and the main liquid material in the bottle may be any liquid beverage product base such as water, soda, lemonade, a soup, and so on.

The term "additive" relates in the present document to a liquid product or component, or to a liquid product or component comprising small solid particles.

The present invention even more particularly relates to static-microdosers or similar devices, which is one of the known technologies for introducing a small quantity of an additive into a bottle, as hereafter detailed. While the term "microdoser" generally designates a device for dosing a fluid in the microlitre range, it should be noted that the present document relates to a device, which may be able to dose a fluid up to one or a few milliliters. Such quantity corresponds to what is called a "small quantity of liquid product" in the present document.

BACKGROUND OF THE INVENTION

The preparation of liquid, for example in the food industry, may require incorporating a small quantity of a liquid product called additive into a bottle, empty or partly filled with a main liquid material. For example, to create flavoured water, an aroma, which is a liquid having a highly concentrated flavour, may be introduced in a bottle after the bottle is filled with water.

A common way to fill bottles or other containers in an industrial facility uses a bottling machine comprising a rotary filling wheel or carousel. The filling carousel is essentially a rotary wheel or rotor of large diameter comprising holding and filling means on its perimeter. Bottles are brought to the holding means of the carousel, and then filled while the carousel rotates through a certain rotation angle.

The additive may be introduced into the bottle by two known alternative methods. First, a rotary microdoser may be added upstream or downstream the filling carousel. The rotary microdoser usually comprises a small rotary wheel with bottle holding means and filling valves installed on it to introduce the additive into the bottles while they travel through a certain angle of the rotary wheel. In other words, introducing an additive into a bottle is performed like the filling of the main liquid material, but using a smaller carousel and dosing valves configured to dose smaller volumes.

A variant of the rotary microdoser described above, consists in a configuration without bottle holding means. Document U.S. Pat. No. 5,955,132 discloses such system, wherein to introduce a flavour or essence, a rotary liquid dispensing machine is used. According to this document, the containers, which have previously been filled to a predetermined level with a beverage, are moved in a train along a predetermined path. A plurality of flavour or essence dispensing nozzle openings are rotated about an axis transverse to the container path, so that successive nozzle openings, when moving along the bottom portion of the arc of their motion, are positioned over and for a time move along with the containers.

Another known solution to introduce a small quantity of liquid into a bottle is the use of a device called "static microdoser". A static microdoser consists of a fixed device configured to generate a jet of pressurized additive when a bottle mouth passes under a nozzle of the microdoser. The static microdoser may typically, but not exclusively, be positioned above a rotary wheel of the bottling machine. Such a device is typically used for introducing a very small quantity of liquid nitrogen into beverage bottles.

Document U.S. Pat. No. 9,440,205 describes some aspects of microdosing systems.

Static microdosers however have drawbacks.

The time available for injection is defined by the time of passage of the opening (mouth, opened neck) of a bottle under the injection nozzle. More particularly, in the beverage industry, it is essential to be able to produce a very large number of bottles in a short time. This requires increasing the speed of production lines. However, the additive dosing time of an additive should not be a parameter limiting the speed of the production lines.

Thus, the time available for dosing is short, but the quantity of additive desired must be able to be introduced into the bottle in this short available time.

Consequently, the static microdosers must be very precise and responsive devices, due to the limited time available for injection. For example, for the production of flavored water, it may be necessary to introduce 0.5 mL of flavor in a bottle in 20 ms or less. This is difficult or impossible to achieve with the current valve design.

Due to the lack of commercially available valves capable of dosing the required quantities in the required time, the available valves have to be modified by installing faster, low inertia, valves. These valves however only make it possible to introduce very small quantities of additive. Several valves may have to be used to each introduce a fraction of the total quantity of additive desired. Multiple valves implies higher cost, synchronization and design complexity, space, and lower reliability.

The invention aims to provide a static device for introducing an additive into a bottle which solves at least one of the above problems, i.e. that is inexpensive (or at least less expensive than a high-precision microdoser), reliable, while able to precisely dose an additive in a very short time that is available for injection.

SUMMARY OF THE INVENTION

The objective set out above is met with a device for dispensing a small quantity of a liquid product, the device comprising a dispensing head. The dispensing head comprises an injection nozzle. The dispensing head is adapted to dispense a desired quantity of liquid product by the injection nozzle. The dispensing head comprises an inlet adapted to be connected to a source of the liquid product and an outlet provided with the injection nozzle.

The dispensing head comprises a first valve and a second valve installed in series, such that:

- an inlet of the first valve forms the inlet of the dispensing head,
- an outlet of the first valve is fluidically connected to an inlet of the second valve,
- a fluid outlet of the second valve is provided with the nozzle, The device comprises a control system configured to command an opening sequence of the first valve and of the second valve, resulting in a time of concomitant opening of said first valve and said second valve.

Because the dispensing of the liquid product only takes place when the first valve and the second valve are both open, the control system can be configured to obtain a concomitant opening of the valves and thus a dispensing time shorter than the minimum opening time of each valve. Inexpensive and highly reliable valves can thus be used to dispense very low but precise quantity of a fluid product.

The first valve and the second valve can be solenoid valves.

The invention has been developed in particular for an application with solenoid valves, but is applicable to any valve actuation technology.

The nozzle can comprise an anti-drip device adapted to stop a liquid product dispensing from the dispensing head upon closing of any one of the first valve and second valve.

The anti-drip device makes it possible to immediately stop dispensing the liquid product as soon as one of the two valves is closed. The control system can be configured to:

- issue a first command for opening one of the first valve and the second valve,
- after a delay following the issuance of the first command, issue a second command for opening the other one of the first valve and the second valve.

The dynamic behavior of the valves, in particular their opening delay and their closing delay is taken into account to determine the respective instant at which the first command and the second command must be generated.

The first command can be a command for opening the first valve and the second command may be a command for opening the second valve.

The opening of the valves in this order, that is to say first of the first valve which is closer to the inlet of the dispensing head, and then the second valve which is closer to the outlet of the dispensing head, generally produces the best results.

The opening of the second valve first is however not excluded from the present invention, and is another embodiment of the invention.

The first command and the second command can be command for the same duration of opening.

The control system can be configured to issue the first command and the second command taking into account the closing delay between the end of the first command and the actual closing of the commanded valve and the opening delay between the issuance of the second command and the actual opening of the commanded valve, such that the time of concomitant opening of the first and second valve has a desired duration comprised between the opening of the valve commanded by the second command and the closing of the valve commanded by the first command.

Indeed, the closing of the first valve will also determine the end of the product dispensing, and the opening of the second valve determines the start of the product dispensing The time of concomitant opening of the first and second valve can thus be less than the lowest actual opening time of the first valve and/or of the second valve that can be obtained in a repeatable manner.

The invention allows in particular a reliable metering of the product delivered, despite valves individually incapable of metering an amount as small as the desired quantity.

The time of concomitant opening of the first valve and second valve can be comprised for example between 5 ms and 40 ms, and preferably between 10 ms. and 30 ms, for example around 20 ms.

This is typically the time available to introduce an additive into a bottle passing on a bottling line.

The quantity of liquid product dispensed during the concomitant opening of the valves can be comprised for example between 0.3 mL and 2 mL, preferably between 0.5 mL and 1 mL.

This is typically the quantity of additive to be introduced into a bottle passing on a bottling line.

The device can further comprise a detection device for detecting a dispensing of liquid product from the dispensing head, the detection device being configured to supply data regarding the detected dispensing to the control system for correction of commands issued by said control system for a following dispensing of the liquid product.

The accuracy of the quantity of product delivered is thus controlled and maintained over time. This avoids any drift related to valve wear. Such a drift is continually corrected.

The invention also relates to a line for filling and bottling bottles of a beverage comprising a device as above described.

This is one of the preferred applications of the present invention.

The invention also relates to a method for introducing a liquid product into a container, the method comprising the steps of:

- providing a device as above described,
- issuing, by the control system, a first command for opening one of the first valve and the second valve,
- issuing, by the control system, a second command for opening the other one of the first valve and the second valve, such that a time of concomitant opening of the first valve and of the second valve is obtained.

The method can further comprise the steps of:

- detecting the dispensing of liquid product from the dispensing head;
- providing data regarding the detected dispensing to the control system; and
- correcting the commands issued by the control system (17) based on the provided data.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION

Figure 1:
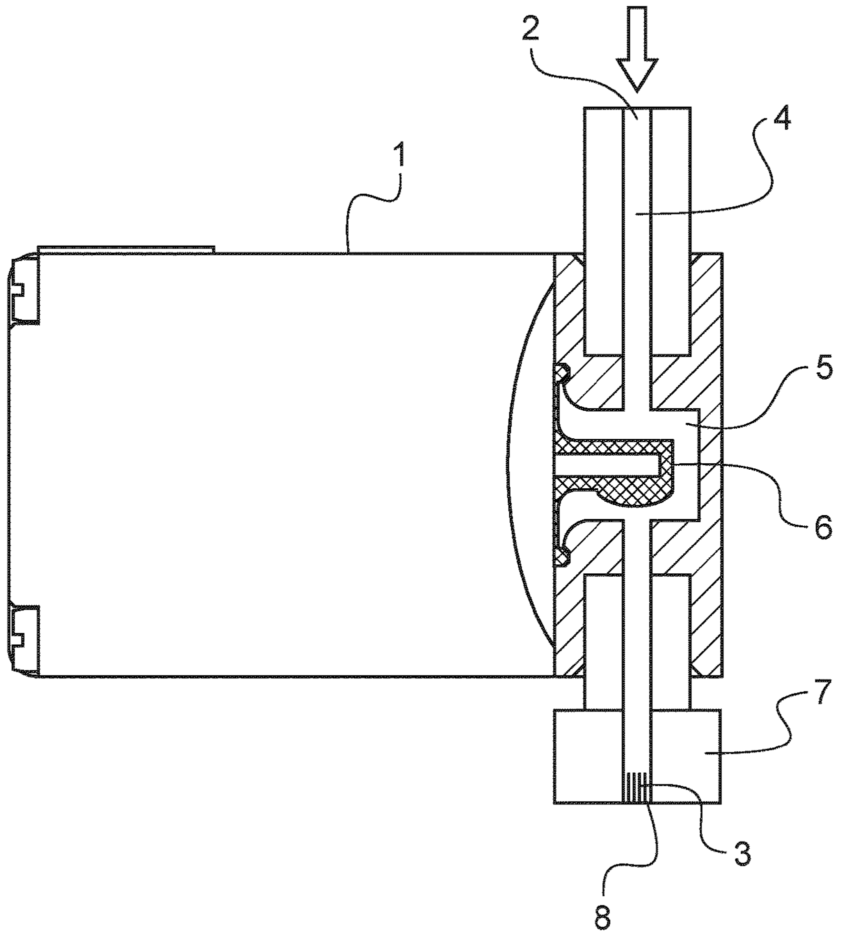
FIG. 1 is a sectional view of a solenoid valve according to the state of the art.

FIG. 1 is a sectional view of a solenoid valve according to the state of the art.

The solenoid valve of FIG. 1 has a valve body 1, an inlet 2 and an outlet 3. The solenoid valve allows or prohibits the passage of a fluid from the inlet 2 to the outlet 3. To achieve this, the valve body 1 contains actuation means (not shown) making it possible to move a shutter member, adapted to seal the duct 4 which connects the inlet 2 to the outlet 3.

In particular, the duct 4 comprises a chamber 5 in which a shutter member 6 is formed by a pallet or a disk. The shutter member 6 can thus adopt a closed position in which it is supported on a seat formed in the duct 4, next to the outlet 3, or an open position in which it is positioned in the middle of the chamber 5, thus allowing the passage of fluid. FIG. 1 shows the shutter member 6 in its open position.

The outlet of the solenoid valve is formed by an injection nozzle 7.

The injection nozzle 7 may comprise, in a known manner, an anti-drip device 8. The anti-drip device 8 may be formed, for example, by a perforated anti-drip plate comprising multiple slots and/or perforations, by concentric tubes forming several capillary passages, or by any other known anti-drip system. This immediately stops the dispensing of product through the nozzle. This also makes it possible to ensure that the liquid product present in the duct 4, between the chamber 5 and the outlet 3, remains in this portion of the duct 4 and can be injected immediately upon the next opening of the valve.

The valve shown in FIG. 1 is a conventional solenoid valve used in the food industry. The valve of FIG. 1 can be used for filling bottles or containers with various liquid or pasty products. However, it is not a valve suitable for dosing very small quantities of products, in particular of the order of a milliliter. This aspect is illustrated by FIG. 2 described below.

Figure 2:
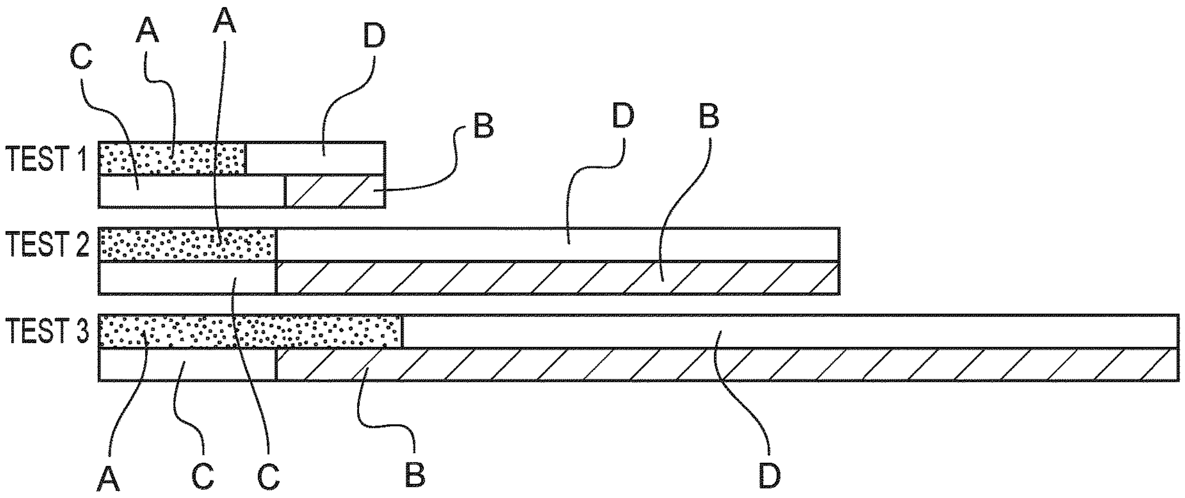
FIG. 2 is a diagram illustrating the opening of the solenoid valve of FIG. 1 according to various commands applied to the solenoid valve.

FIG. 2 is a diagram illustrating the opening of the solenoid valve of FIG. 1 according to various commands applied to the solenoid valve. More particularly, several tests were carried out on the valve of FIG. 1. The results of three of these tests are shown in FIG. 2.

In each of these three tests, a command to open the valve is sent to the valve. For each test, the command to open the valve has a different duration. For each test, the actual opening of the valve is measured over time. The actual opening of the valve corresponds in these tests to the period during which the product is dispensed by the valve. All these tests are performed with water and a supply pressure of 2 bar.

The expression "opening time" does not therefore refer to the time it takes the valve to change state from a fully closed to a fully open condition. Moreover, the term "opening" is generally used herein to refer to the condition of the valve in which product can be dispensed.

FIG. 2 is a timing diagram. For each test, the bar containing dots represents the valve opening command A. The hatched bar represents the actual opening B of the valve.

Test 1

A 7 milliseconds opening command A is provided to the valve. The result is that the valve has an actual opening time B of 5 ms. There is an opening delay C of 9.5 ms (i.e., the valve opens 9.5 ms after the beginning of the opening command A). There is a closing delay D of 7 ms (i.e., the valve closes 7 ms after the end of the opening command A). The valve has dispensed less than 0.1 g of liquid product.

Test 2

An 8 milliseconds opening command A is provided to the valve. The result is that the valve has an actual opening time B of 28.5 ms. There is an opening delay C of 9 ms. There is a closing delay D of 28.5 ms. The valve has dispensed 1.23 g of liquid product.

Test 3

A 15 milliseconds opening command A is provided to the valve. The result is that the valve has an actual opening time B of 45.5 ms. There is an opening delay C of 9 ms. There is a closing delay D of 39 ms. The valve has dispensed 1.80 g of liquid product.

It is shown by these tests that the actual minimum repeatable opening time of the tested valve is around 28 ms, and is obtained with an 8 ms command (test 2). With an opening command of less than 8 ms (e.g. test 1), the valve fails to fully open. In fact, the valves remains essentially closed, and only delivers a very low and unpredictable quantity of liquid product.

More generally, the Applicant has found that, for any command having a duration higher than a certain value, the opening delay and the closing delay become stable. For the tested example valve, any command of more than 12 ms will result in:

an opening delay of 8 to 9 ms; and a closing delay of 37 to 40 ms.

It follows from these results that the valve tested is not compatible for the injection of small quantities of product, typically of the order of 1 ml (1 g for water) or less.

However, the type of valve shown in FIG. 1 and tested in FIG. 2 is widely available, reliable, and relatively inexpensive. It would be advantageous to be able to use it for dosing small quantities of liquid products, A solution according to the present invention, based on the results shown above, is presented in FIG. 3.

Figure 3:
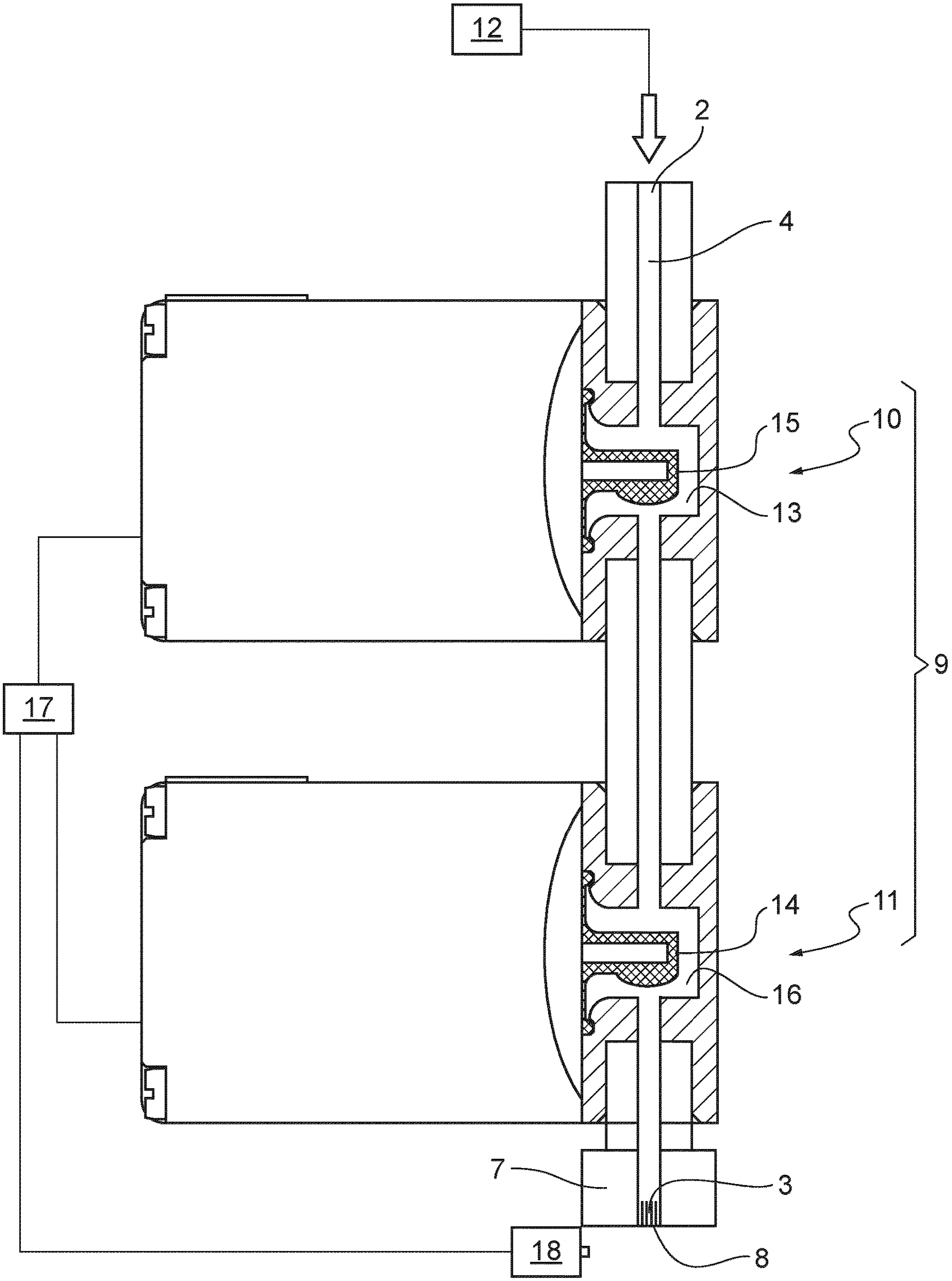
FIG. 3 is a sectional view of a device for dispensing a liquid product according to a first embodiment of the invention.

FIG. 3 represents a sectional view of a device for dispensing a liquid product according to a first embodiment of the invention. As shown in FIG. 3, the device comprises a dispensing head 9 formed by the serial assembly of two solenoid valves. More particularly, a first valve 10 and a second valve 11 are mounted in series.

By "mounted in series", it is meant that the outlet of the first valve 10 is fluidically connected to the inlet of the second valve 11. The term "inlet" relates to the fluidic port of a valve by which the fluid actually enters in the valve. The term "outlet" relates to the fluidic port of a valve by which the fluid actually exits from the valve. Solenoid valves can have a recommended direction of use. This means that it may be recommended by the valve manufacturer to use one of the fluid ports of the valve as the inlet (referred to as "admission port" in the present document), and to use another fluid port of the valve (referred to as "exit port" in the present document) as the outlet. However, for some reasons hereafter explained, it may be advantageous in some embodiments of the invention to use the exit port of at least one of the first valve and the second valve as inlet, and consequently the admission port as outlet.

The inlet of the first valve 10 forms the inlet 2 of the device. The inlet 2 is connected to a source of liquid product 12. This source is adapted to provide the liquid product to the inlet 2 of the device, in sufficient quantity and with a given and relatively stable supply pressure.

The outlet of the second valve 11 forms the outlet 3 of the device. The outlet 3 is provided with a nozzle 7. As for the device of FIG. 1, the injection nozzle 7 comprises, in the represented example embodiment, an anti-drip device 8. The anti-drip device 8 may be formed by a plate comprising slots and/or perforations, or another anti-drip device, as previously described.

As above explained, the outlet of the first valve 10 is fluidically connected to the inlet of the second valve 11. A duct 4 is thus formed between the inlet 2 and the outlet 3. The duct 4 comprises a first chamber 13 of the first valve 10 and a second chamber 14 of the second valve 11.

In the first chamber 13, a first pallet 15 (shutter member) can move between a closed position in which it blocks the passage of fluid and an open position in which it allows passage of fluid.

In the second chamber 14, a second pallet 16 (shutter member) can move between a closed position in which it blocks the passage of fluid and an open position in which it allows for passage of fluid.

The opening of each valve is controlled by the same control system 17 (or distinct control systems able to communicate for synchronization, thus being considered as a same control system in the present document).

The control system 17 is adapted to command the opening of the first valve and the opening of the second valve according to an opening sequence. To allow the passage of the liquid product and its delivery, the two valves must be in the open position at the same time. According to a principle developed in the present invention, the opening sequence commanded by the control system results in a time of concomitant opening of said first valve and second valve. In other words, the respective opening times of the first valve and of the second valve "overlap" during the time of concomitant opening of the valves.

Figure 4:
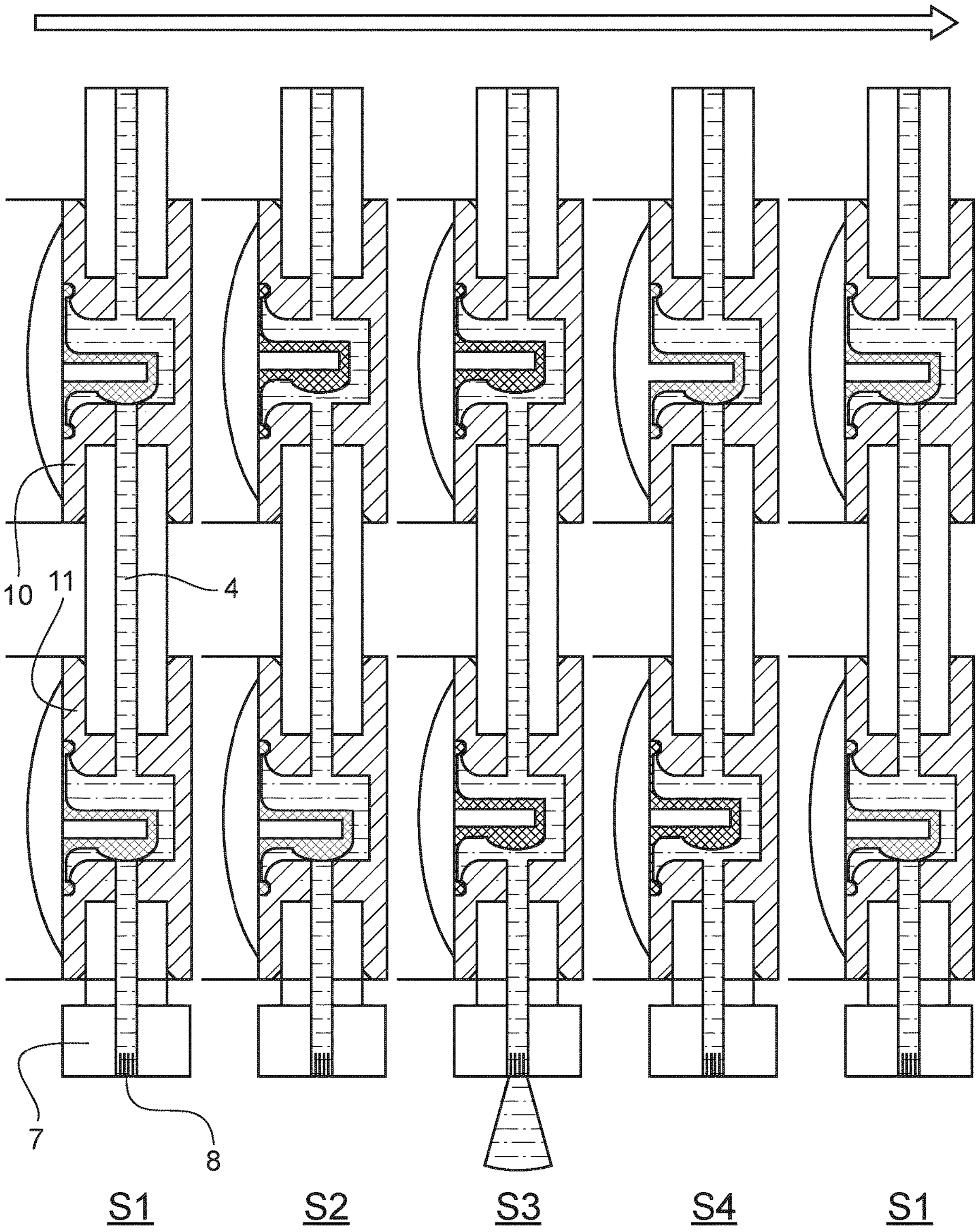
FIG. 4 is a diagram showing the successive states of the device of FIG. 3 to carry out injections of a liquid product.

This principle is illustrated in FIG. 4, which is a timing diagram showing the successive states of the device of FIG. 3 to carry out injections of a liquid product.

FIG. 4 thus represents four states that the first valve 10 and the second valve 11 of the dispensing head 9 take successively during a dispensing cycle of liquid product. These five states are referenced S1 to S4.

The first state S1 corresponds to the state of the valves of the dispensing head 9 at the start of a liquid product dispensing cycle.

The first valve 10 is closed, the second valve 11 is closed, and the liquid product does not circulate in the duct 4. It will nevertheless be noted that liquid product is present in the duct 4, due to a dispensing of liquid product during a previous dispensing cycle. The anti-drip device 8 holds the product in the lower portion of the duct 4.

In the second state S2 one of the first valve and the second valve is open, while the other is closed. In the represented preferred embodiment, the first valve 10 is open, and the second valve 11 is still closed. The liquid product does not circulate in the duct 4, thanks to the closed position of the second valve 11.

After a certain time, the distribution head is placed in the third state S3. In the third state S3, the first valve 10 is still open, and the second valve 11 is open.

Thanks to this concomitant opening state of the first valve and of the second valve, the liquid product circulates in the duct 4. The liquid product is dispensed by the nozzle 7 as long as the dispensing head remains the third state S3, i.e. as long as both the first valve and the second valves remain in open position.

When the dispensing of liquid product has to be stopped, the distribution head is placed in the fourth state S4. In the fourth state S4, the first valve 10 is closed, and the second valve 11 is still open Thanks to the closed position of the first valve 10, the liquid product does not circulate in the duct 4. The distribution of liquid product stops immediately, in particular thanks to the anti-drip device 8.

The valves of the dispensing head 9 are then brought back to the first state S1 to start a new dispensing cycle for liquid product. In the first state S1 the first valve 10 is closed and the second valve 11 is closed.

It follows from the above description of the dispensing sequence that the control system 17 must be configured so that the third step S3 takes place at the desired time, for example when the opening of a container to be filled passes under the dispensing nozzle 7.

This is achieved through precise control and synchronization of the opening controls of the first valve 10 and the second valve 11. This precise control is based on the teaching learned from the tests presented in FIG. 2. The way to obtain such control is illustrated in FIGS. 5 and 6.

Figure 5:
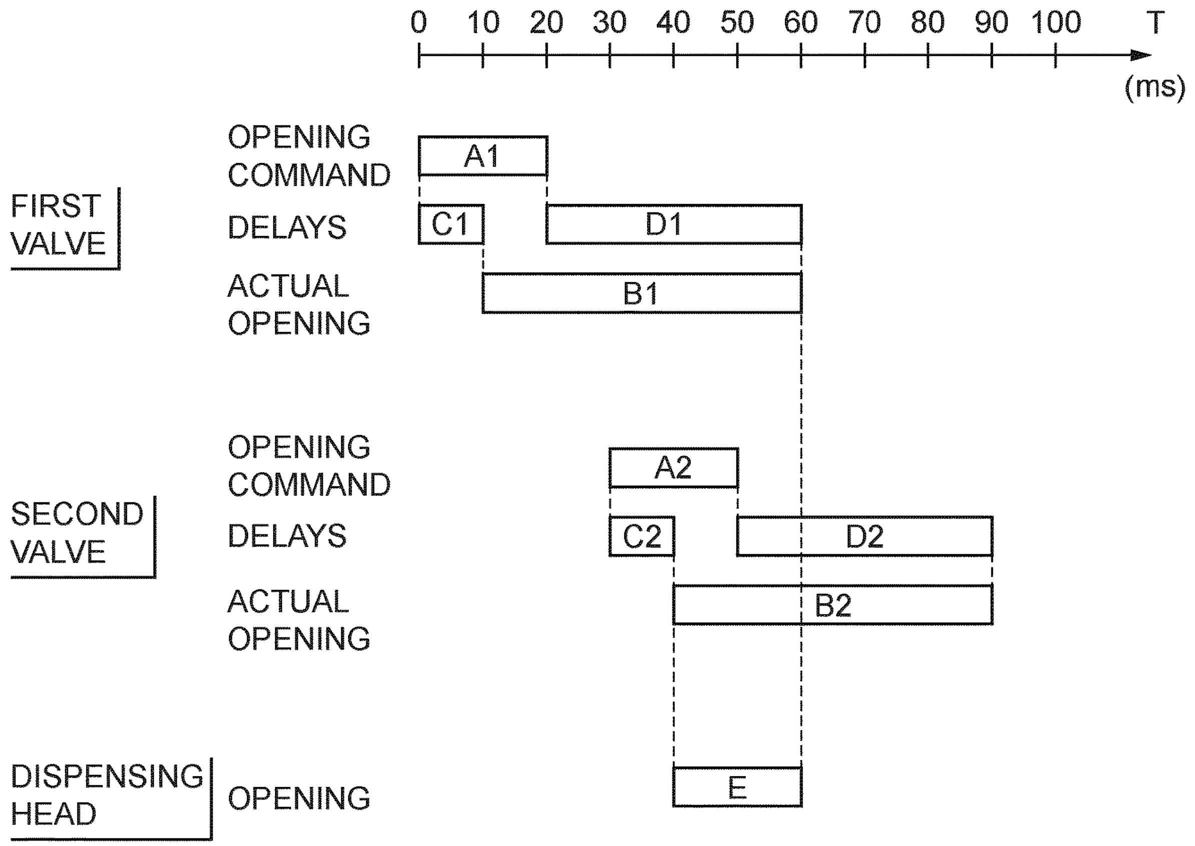
FIG. 5 is a diagram illustrating the opening of the solenoid valves of the device of FIG. 3 according to a first example of commands applied to the solenoid valves.
Figure 6:
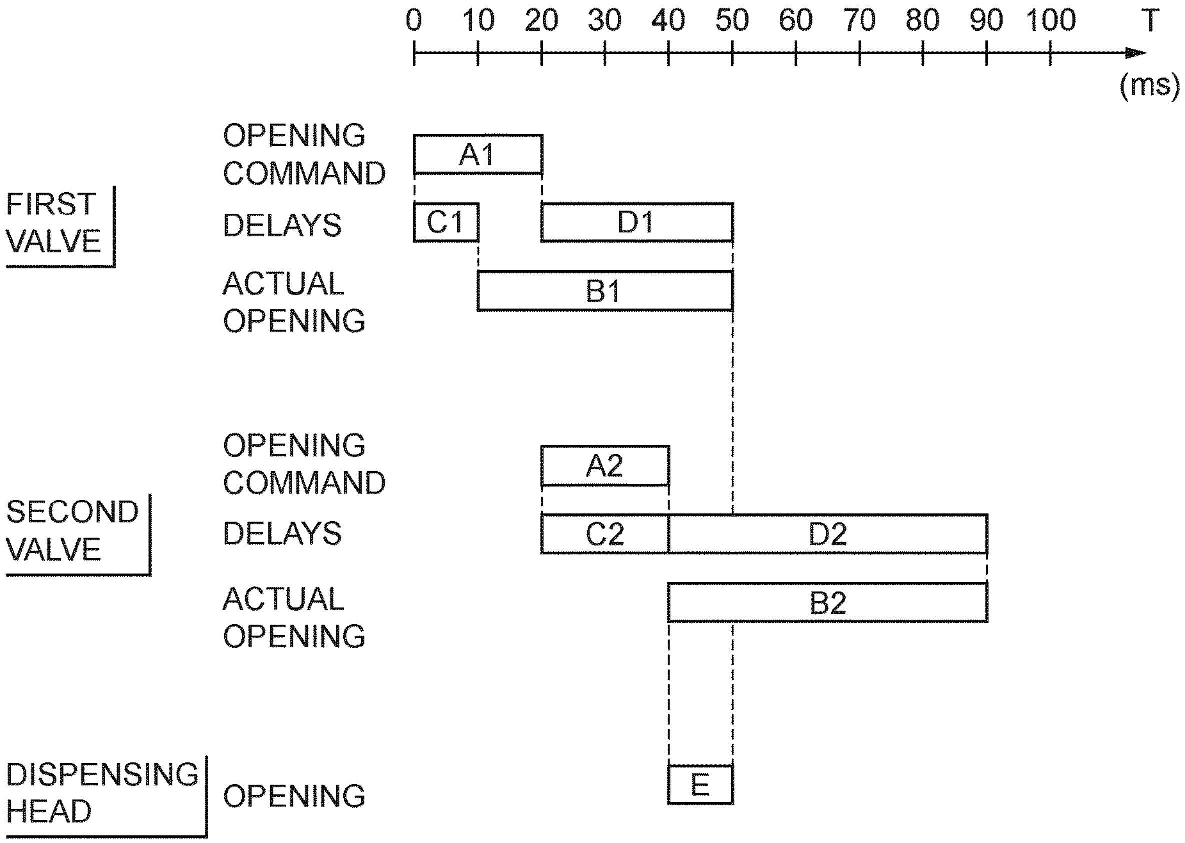
FIG. 6 is a diagram illustrating the opening of the solenoid valves of the device of FIG. 3 according to a second example of commands applied to the solenoid valves.

FIG. 5 is a diagram illustrating the opening of the solenoid valves of the device of FIG. 3 according to a first example of commands applied to the solenoid valves.

The diagram in FIG. 5 is based on the following hypotheses (which are simple examples of hypotheses given by way of illustration, and which will be adapted to the valves selected to constitute a distribution head).

In the dispensing head, the first valve and the second valve have the same physical behavior, (provided that the opening command A issued from the control system has a sufficient duration, as explained in FIG. 2), namely:

- an opening delay C of 10 ms between the start of the opening command issued from the control system and the actual opening B of the valve; and
- a closing delay D of 40 ms, between the end of the opening command A and the actual closing of the valve.

In FIG. 5, time is represented on a time scale in milliseconds (ms). The time marker "zero" corresponds to the instant of issuance of a first command A1 to open the first valve.

The first command A1 is a 20 ms opening command of the first valve, this time being sufficient to ensure the full opening of the first valve and a repeatable behavior of said first valve.

After a first opening delay C1 of 10 ms, the first valve opens. The actual opening B1 of the first valve 10 starts.

The first command A1 stops after 20 ms. Due to the first closing delay D1 of 40 ms, the first valve 10 remains open for 40 ms after the first command A1 is stopped.

It follows that the first valve has an actual opening B1 which lasts for 50 ms, between time marker 10 ms and time marker 60 ms. Indeed, due to the opening delay the first valve 10 opens at time marker 10 ms and due the closing delay, the first valve 10 closes at time marker 60 ms, that is to say 60 ms after the start of the first command A1 taken as temporal reference in FIG. 5.

The objective pursued in the example of FIG. 5 is to obtain an opening of the dispensing head E of 20 ms, corresponding to the actual dispensing time and to the time of concomitant opening of the first valve 10 and the second valve 11.

This is achieved by the issuance, at a right time, of a second command A2 for opening the second valve.

The second command A2 is a 20 ms opening command of the second valve, this time being sufficient to ensure the full opening of the second valve and a repeatable behavior of said second valve.

By taking into account the opening delay and closing delay of the first valve and of the second valve, the instant at which the second command A2 must be generated can be determined.

In particular, by taking into account:

- the closing delay of the first valve which determines the instant of closing of the dispensing head, and
- the opening delay of the second valve which determines the instant of opening of the dispensing head,
- the instant at which the second command A2 must be generated relative to the first command A1 can be determined.

In the represented example, the second command A2 starts at the time marker 30 ms, that is to say 30 ms after the start of the first command taken as temporal reference in FIG. 5.

After a second opening delay C2 of 10 ms, the second valve opens. The actual opening B2 of the second valve 11 starts.

The second command A2 stops after 20 ms. Due to the second closing delay D2 of 40 ms, the second valve 11 remains open for 40 ms after the second command is stopped.

It follows that the second valve has an actual opening B2 which lasts for 50 ms, between time marker 40 ms and time marker 90 ms.

The opening of the dispensing head E corresponding to the concomitant opening of the first valve 10 and the second valve 11 thus lasts from time marker 40 ms (actual opening of the second valve 11, while the first valve is still open) to time marker 60 ms (actual closing of the first valve, while the second valve is still open).

An opening time of the dispensing head E of 20 ms is so obtained with the first and the second valve having each an opening time of 50 ms.

FIG. 6 is a diagram illustrating the opening of the solenoid valves of the device of FIG. 3 according to a second example of commands applied to the solenoid valves.

In the example of FIG. 6, the objective is to obtain an opening of the dispensing head E of 10 ms, with a dispensing head comprising:

- a first valve having an opening delay of 10 ms and a closing delay of 30 ms, and
- a second valve having an opening delay of 20 ms and a closing delay of 50 ms.

The first command A1 is a 20 ms opening command of the first valve.

After a first opening delay C1 of 10 ms, the first valve opens. The actual opening B1 of the first valve 10 starts.

The first command A1 stops after 20 ms. Due to the first closing delay D1 of 30 ms, the first valve 10 remains open for 30 ms after the first command is stopped.

It follows that the first valve has an actual opening B1 which lasts for 40 ms, between time marker 10 ms and time marker 50 ms.

The closing instant of the first valve will correspond to the closing instant of the dispensing head.

The dispensing head will thus close at time marker 50 ms. For an opening time of the dispensing head of 10 ms, the dispensing head must thus open at time marker 40 ms.

The opening instant of the dispensing head corresponds to the actual opening instant of the second valve. Because of the second opening delay C2 of 20 ms, it is determined that the second command A2, for opening the second valve, must be issued at time marker 20 ms.

The opening of the dispensing head is thus obtained for a duration of 10 ms, between the time marker 40 ms and the time marker 50 ms.

Figure 7:
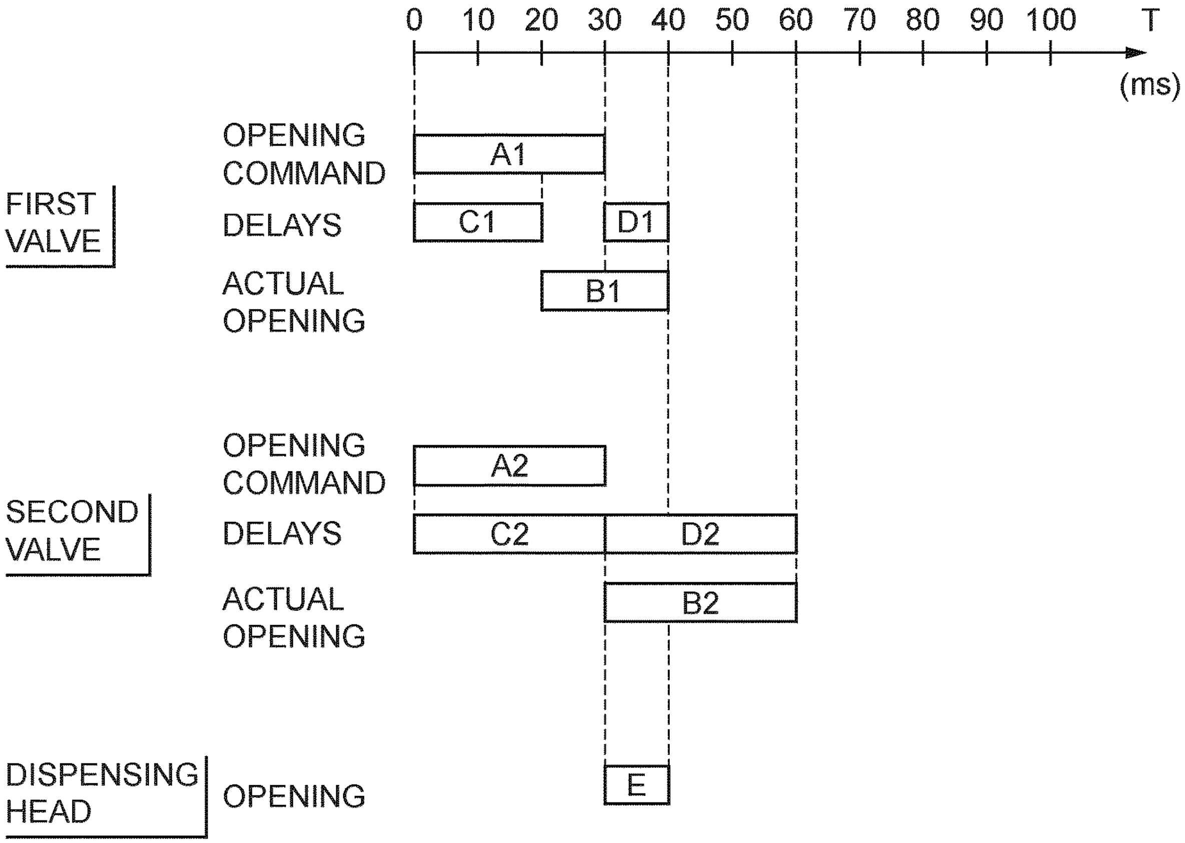
FIG. 7 is a diagram illustrating the opening of the solenoid valves of the device according to an embodiment of the invention, according to a third example of commands applied to the solenoid valves.

FIG. 7 is a diagram illustrating the opening of the solenoid valves of a device according to an embodiment of the invention, according to a third example of commands applied to the solenoid valves.

In the examples of FIG. 5 and FIG. 6, the first valve and the second valve both have a longer closing delay than their opening delay. While this is generally the case, the opposite is possible. One or two valves having a longer opening delay than their closing delay, or substantially the same opening delay and closing delay can also be used in embodiments of the invention. Such a configuration is illustrated in FIG. 7.

In the example of FIG. 7, the objective is to obtain an opening of the dispensing head E of 10 ms, with a dispensing head comprising:

- a first valve having an opening delay of 20 ms and a closing delay of 10 ms, and
- a second valve having an opening delay of 30 ms and a closing delay of 30 ms.

For the valves of the example of FIG. 6, let us consider that an opening command of 30 ms or more is necessary to obtain a repeatable behavior of each valve.

The first command A1 is a 30 ms opening command of the first valve.

After a first opening delay C1 of 20 ms, the first valve opens. The actual opening B1 of the first valve 10 starts.

The first command A1 stops after 30 ms. Due to the first closing delay D1 of 10 ms, the first valve 10 remains open for 10 ms after the first command is stopped.

It follows that the first valve has an actual opening B1 which lasts for 20 ms, between time marker 20 ms and time marker 40 ms.

The closing instant of the first valve will correspond to the closing instant of the dispensing head.

The dispensing head will thus close at time marker 40 ms. For an opening time of the dispensing head of 10 ms, the dispensing head must thus open at time marker 30 ms.

The opening instant of the dispensing head corresponds to the actual opening instant of the second valve. Because of the second opening delay C2 of 30 ms, it is determined that the second command A2, for opening the second valve, must be issued at time marker 0 ms, i.e. at the same time as the issuance of the first opening command A1. This can be advantageous in that no synchronization between the first opening command and the second opening command is necessary in this case.

The opening of the dispensing head is thus obtained for a duration of 10 ms, between the time marker 30 ms and the time marker 40 ms.

Figure 8:
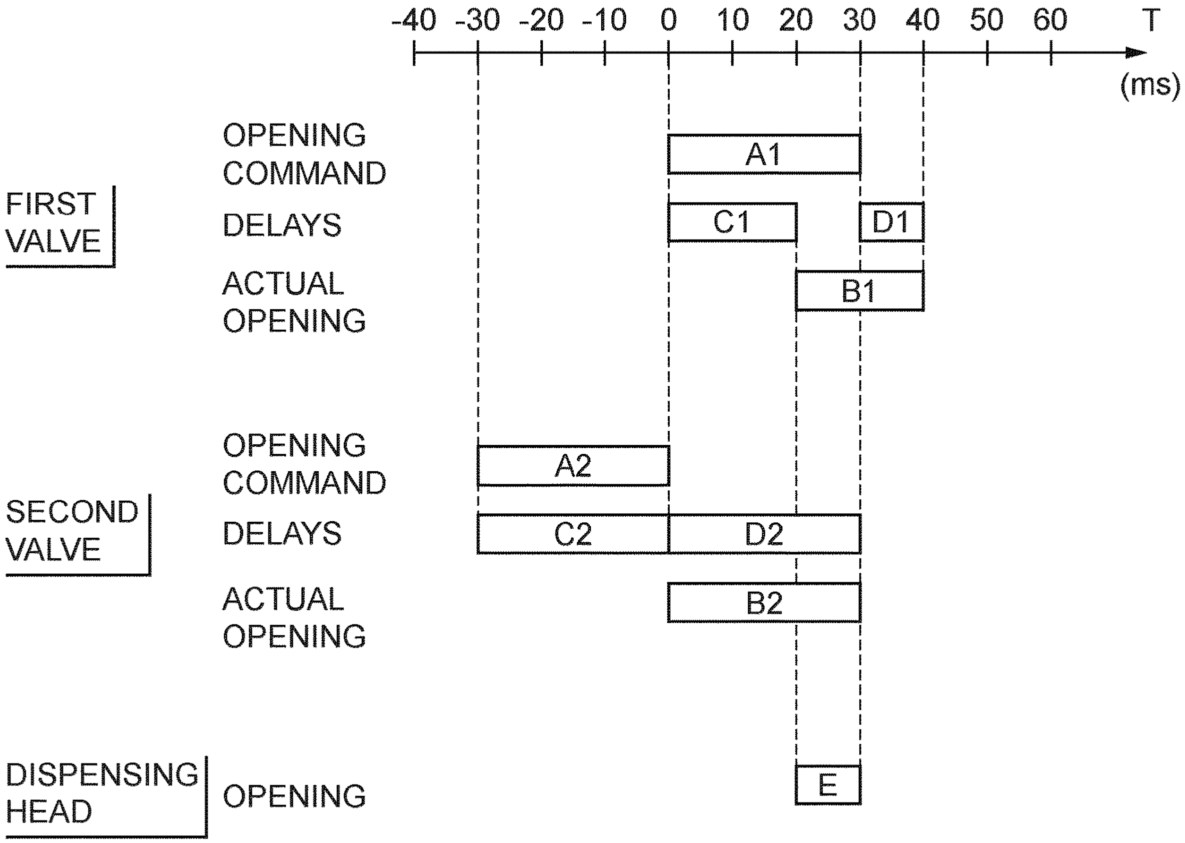
FIG. 8 is a diagram illustrating the opening of the solenoid valves of a device according to an embodiment of the invention, according to a fourth example of commands applied to the solenoid valves.

FIG. 8 is a diagram illustrating the opening of the solenoid valves of a device according to an embodiment of the invention, according to a fourth example of commands applied to the solenoid valves.

The assumptions regarding behavior of the first valve and of the second valve are the same as those of FIG. 7.

However, in the example embodiment of FIG. 8, it is chosen to use the opening instant of the first valve as the opening instant of the dispensing head, which corresponds to the start of the concomitant opening of the first and second valves. Because the first command A1 starts at time marker 0 ms, and due to the opening delay C1 of 20 ms, the actual opening B1 of the first valve starts at time marker 20 ms.

To obtain opening of the dispensing head having a duration of 10 ms, the actual opening of the second valve B2 must thus end at time marker 30 ms. Because of the closing delay D2 of 30 ms, the second command A2 must thus ends at time marker 0 ms, and the second command A2 must thus be issued at time marker −30 ms (i.e. 30 ms before the issuance of the first command A1).

In such case, the second command A2 of FIG. 8 will thus be the in fact the first command issued, and the first command A1 will be the second command issued.

According to the principle exemplified in FIGS. 5 to 8, the invention makes it possible to obtain a dispensing head which allows the dispensing of a liquid product for a period less than the minimum opening period of the valves which it comprises.

The choice of the configuration may also take into account that the valve may have some gradual change in flowrate at opening and closing.

Many configurations are possible in the invention, as long as the behavior of the valves is known. It is thus important to know, for each valve:

- what is the minimum command duration to obtain a significant and reproducible opening of the valve, a stable opening delay, and a stable closing delay, and
- what are the (stable) values of the opening delay and of the closing delay of the valve.

The physical behavior of a valve depends on the type of valve. For example, a solenoid valve can be configured so that it is closed in the absence of supply of an electric current. A solenoid valve can on the contrary be configured so that it is open in the absence of supply of an electric current.

In the case of a solenoid valve open in the absence of electric current, the opening command for such a valve therefore corresponds to the stopping of the supply of an electric current (i.e stopping to electrically energize the valve). In such a solenoid valve, which is generally brought back to the open position using a spring, a short time is generally necessary to obtain a full opening, but a time which can be longer may be necessary to close the valve, compared to a solenoid valve which is closed in the absence of supply of an electric current.

The physical behavior of a valve depends on its direction of use. Indeed, the pressure of the fluid at the inlet of the valve pushes on the shutter element of the valve. This can have consequences on the time to close and/or on the time to open the valve. More particularly this can have consequences on the opening delay and/or on the closing delay of the valve.

Generally, when the seat on which the shutter element 6 is supported in the closed position of the valve is near the outlet 3 of the valve (i.e. at the outlet of the chamber 5), the pressure of the fluid will tend to close the valve. This can reduce the time to close the valve, and possibly increase the time to open the valve. When the seat on which the shutter element 6 is supported in the closed position of the valve is near the inlet of the valve (i.e. at the inlet of the chamber 5), the pressure of the fluid will tend to open the valve, to reduce the time to open the valve, and possibly to increase the time to close the valve.

In other words, for a rocking solenoid valve, the behavior of the valve could depend on the rocking directions of the shutter element 6.

To benefit from this phenomenon, commercially available valves may be intentionally installed in the direction opposite to their recommended direction of use. In such case, the exit port of at least one of the first valve and the second valve is used as inlet of the valve, and consequently the admission port as outlet of the valve.

FIGS. 9-14 are schematic sectional views of several embodiments of the invention. All these configurations are represented in absence of supply of an electric current.

Figure 9:
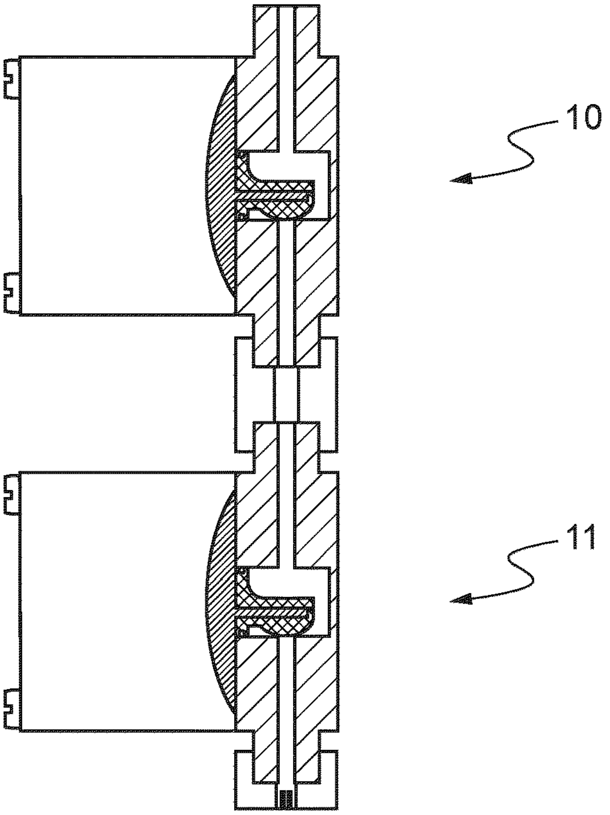
FIGS. 9-14 are schematic sectional views of several embodiments of the invention.

FIG. 9 represents the most common configuration of the invention. In this configuration, the first valve 10 is closed in absence of supply of an electric current and the second valve 11 is closed in absence of supply of an electric current. The seat of the first valve 10 is near the outlet of the valve. The seat of the second valve 11 is near the outlet of the valve. The fluid pressure and the fluid stream thus tend to help close the first valve and to help close the second valve.

Figure 10:
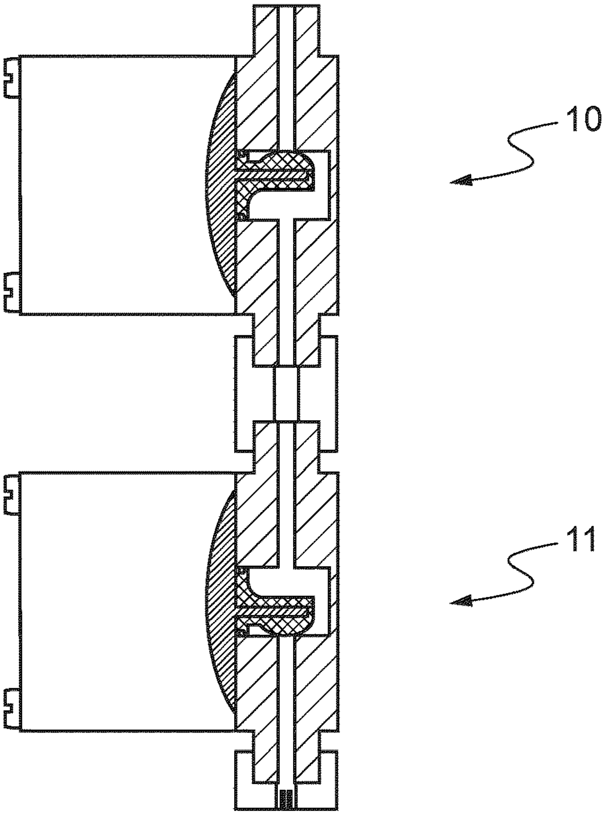

In the configuration of FIG. 10, the first valve 10 is closed in absence of supply of an electric current and the second valve 11 is closed in absence of supply of an electric current. The seat of the first valve 10 is near the inlet of the valve. The seat of the second valve 11 is near the outlet of the valve. The fluid pressure and the fluid stream thus tend to help open the first valve and to help close the second valve.

Figure 11:
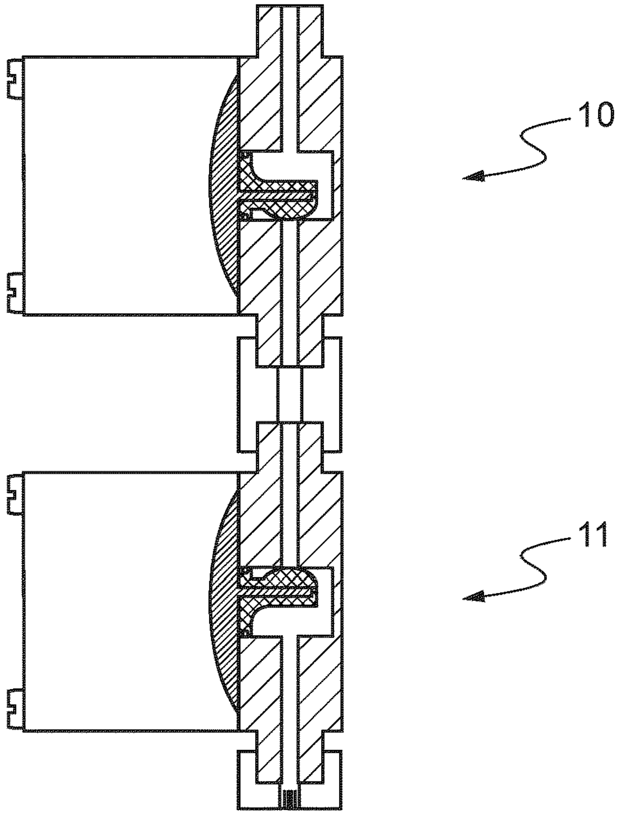

In the configuration of FIG. 11, the first valve 10 is closed in absence of supply of an electric current and the second valve 11 is closed in absence of supply of an electric current. The seat of the first valve 10 is near the outlet of the valve. The seat of the second valve 11 is near the inlet of the valve. The fluid pressure and the fluid stream thus tend to help close the first valve and to help open the second valve.

Figure 12:
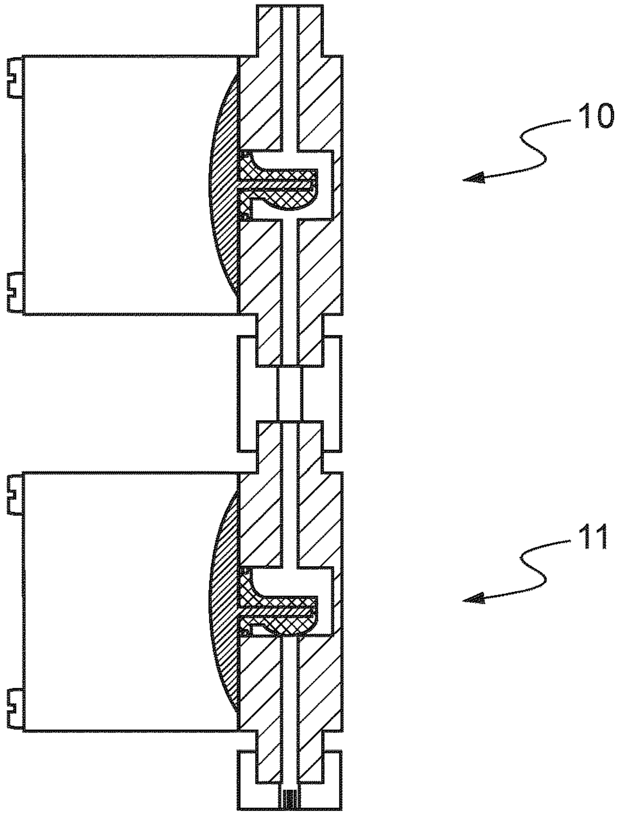

In the configuration of FIG. 12, the first valve 10 is open in absence of supply of an electric current and the second valve 11 is closed in absence of supply of an electric current. The seat of the first valve 10 is near the outlet of the valve. The seat of the second valve 11 is near the outlet of the valve. The fluid pressure and the fluid stream thus tend to help close the first valve and to help close the second valve.

Figure 13:
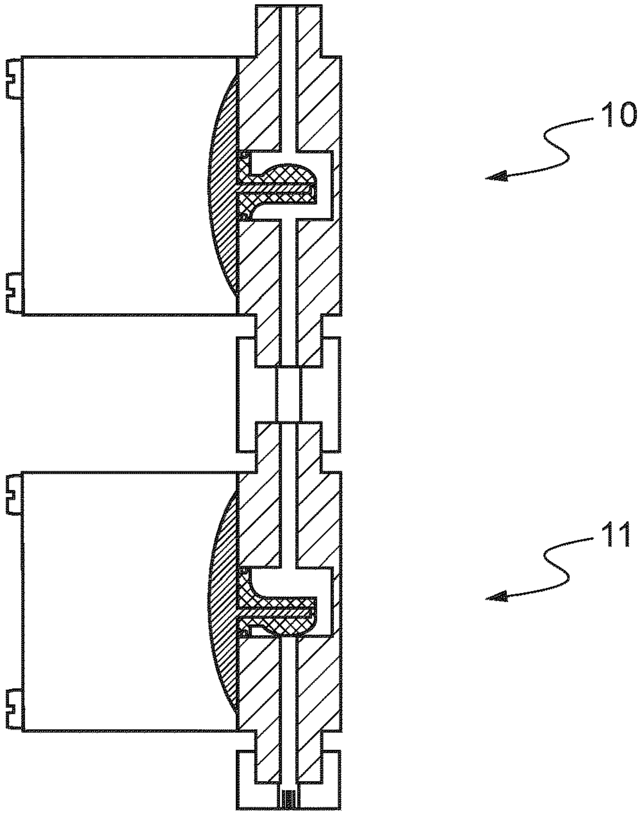

In the configuration of FIG. 13, the first valve 10 is open in absence of supply of an electric current and the second valve 11 is closed in absence of supply of an electric current. The seat of the first valve 10 is near the inlet of the valve. The seat of the second valve 11 is near the outlet of the valve. The fluid pressure and the fluid stream thus tend to help open the first valve and to help close the second valve.

Figure 14:
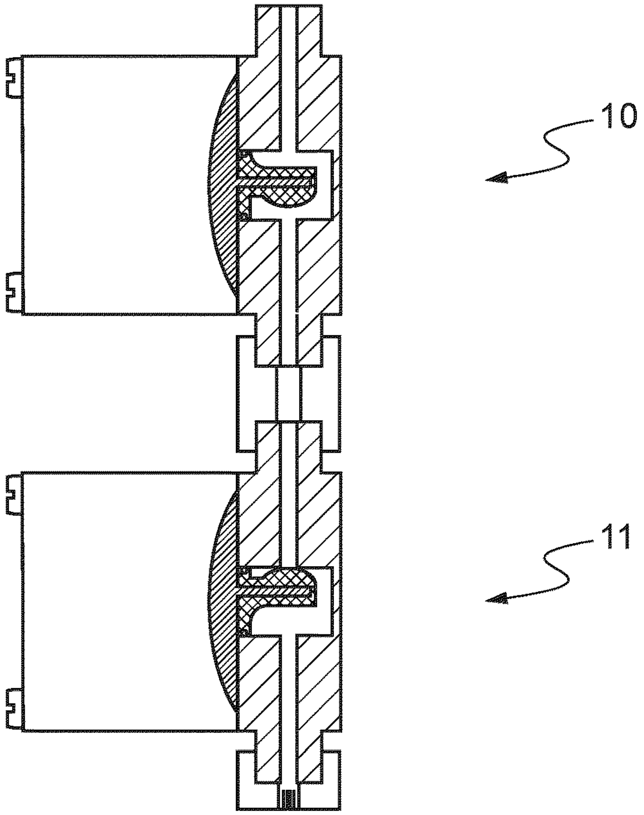

In the configuration of FIG. 14, the first valve 10 is open in absence of supply of an electric current and the second valve 11 is closed in absence of supply of an electric current. The seat of the first valve 10 is near the outlet of the valve. The seat of the second valve 11 is near the inlet of the valve.

The fluid pressure and the fluid stream thus tend to help close the first valve and to help open the second valve.

Other configurations are possible, for example in which both valves are open in absence of supply of an electric current.

The invention makes it possible to obtain a dispensing head which allows the dispensing of a liquid product for a period less than the minimum opening period of the valves which it comprises. The valves used are inexpensive and reliable. The distribution head obtained is also inexpensive and reliable.

Finally, it should however be noted that the behavior of a valve can vary over time, due to the wear of the elements which constitute it. This can affect its dynamic characteristics. In order to allow a control and if necessary a correction of the opening time of the dispensing head 9, the dispensing head 9 can be equipped, at the outlet 3 of the nozzle 7, with a detection device 18 (shown in FIG. 3). The detection device is adapted for detecting a dispensing of liquid product from the dispensing head. The detection device is further configured to supply detected or measured data regarding the detected dispensing to the control system for correction of commands issued by said control system for an upcoming dispensing of the liquid product. Typically, the provided data are temporal data, i.e. the start time and end time of product dispensing, that can be compared to the expected start and end times determined as explained in FIGS. 5 to 8.

The invention finds a preferred, but not exclusive, application in the introduction of a liquid additive in a food product or a beverage. More particularly, the invention can be used for the introduction of a flavoring concentrate in a bottle of water to obtain flavored water. In such case, the time available for the introduction of the additive into the bottle is very short, typically around 20 ms.

It should be understood that various changes and modifications to the presently preferred embodiments described herein will be apparent to those skilled in the art. Such changes and modifications can be made without departing from the spirit and scope of the present invention and without losing its attendant advantages. It is therefore intended that such changes and modifications be covered by the appended claims.

The invention claimed is:

1. A device for dispensing a small quantity of a liquid product, the device comprising a dispensing head comprising an injection nozzle, the dispensing head being adapted to dispense a desired quantity of liquid product by the injection nozzle, the dispensing head comprising an inlet adapted to be connected to a source of the liquid product and an outlet provided with the injection nozzle, wherein the dispensing head comprises a first valve and a second valve installed in series, such that:

an inlet of the first valve-forms the inlet of the dispensing head, an outlet of the first valve is fluidically connected to an inlet of the second valve, a fluid outlet of the second valve is provided with the nozzle, and wherein the device comprises a control system configured to command an opening sequence of the first valve and of the second valve, resulting in a time of concomitant opening of said first valve and said second valve.

2. A device according to claim 1, wherein the first valve and the second valve are solenoid valves.

3. A device according to claim 1, wherein the nozzle comprises an anti-drip device adapted to stop a liquid product dispensing from the dispensing head-upon closing of any one of the first valve and second valve.

4. A device according to any one of the preceding claim 1, Wherein the Control System is Configured to:

issue a first command for opening one of the first valve and the second valve, and after a delay following the issuance of the first command, issue a second command for opening the other one of the first valve and the second valve.

5. A device according to claim 4, wherein the first command is a command for opening the first valve and the second command is a command for opening the second valve.

6. A device according to claim 4, wherein the first command and the second command are command for the same duration of opening.

7. A device according to claim 4, wherein the control system is configured to issue the first command and the second command taking into account the closing delay between the end of the first command and the actual closing of the commanded valve and the opening delay between the issuance of the second command and the actual opening of the commanded valve, such that the time of concomitant opening of the first and second valve has a desired duration comprised between the opening of the valve commanded by the second command and the closing of the valve commanded by the first command.

8. A device according to claim 1, wherein the time of concomitant opening of the first and second valve is less than the lowest actual opening time of the first valve and/or of the second valve that can be obtained in a repeatable manner.

9. A device according to claim 1, wherein the time of concomitant opening of the first valve and second valve is comprised between 5 ms and 40 ms, and preferably between 10 ms.

10. A device according to claim 1, wherein the quantity of liquid product dispensed during the concomitant opening of the valves is between 0.3 mL and 2 mL.

11. A device according to claim 1 further comprising a detection device for detecting a dispensing of liquid product from the dispensing head, the detection device being configured to supply data regarding the detected dispensing to the control system for correction of commands issued by said control system for a following dispensing of the liquid product.

12. A method for introducing a liquid product into a container, the method comprising the steps of:

providing a device comprising a dispensing head comprising an injection nozzle, the dispensing head being adapted to dispense a desired quantity of liquid product by the injection nozzle, the dispensing head comprising an inlet adapted to be connected to a source of the liquid product and an outlet provided with the injection nozzle, wherein the dispensing head comprises a first valve and a second valve installed in series, such that:

an inlet of the first valve forms the inlet of the dispensing head, an outlet of the first valve is fluidically connected to an inlet of the second valve, a fluid outlet of the second valve is provided with the nozzle, and wherein the device comprises a control system configured to command an opening sequence of the first valve and of the second valve, resulting in a time of concomitant opening of said first valve and said second valve, issuing, by the control system, a first command for opening one of the first valve and the second valve, issuing, by the control system, a second command for opening the other one of the first valve and the second valve, and such that a time of concomitant opening of the first valve and of the second valve is obtained.

13. A method according to claim 12, wherein it further comprises the steps of:

detecting the dispensing of liquid product from the dispensing head;

providing data regarding the detected dispensing to the control system; and correcting the commands issued by the control system based on the provided data.

* * * * *